(12) United States Patent
Jex et al.

(10) Patent No.: US 7,200,661 B2
(45) Date of Patent: Apr. 3, 2007

(54) SYSTEM AND METHOD FOR REGISTERING A CLIENT DEVICE

(75) Inventors: Alan R Jex, Highland, UT (US); Mark Mellor Pinegar, Provo, UT (US); Kevin Lee Wilkins, Provo, UT (US); Hong Zhu, Provo, UT (US); Ronald Martin Tanner, Provo, UT (US); Matthew Edward Lewis, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 726 days.

(21) Appl. No.: 09/741,425

(22) Filed: Dec. 21, 2000

(65) Prior Publication Data

US 2003/0065781 A1    Apr. 3, 2003

(51) Int. Cl.
*G06F 15/173* (2006.01)

(52) U.S. Cl. ............... 709/226; 707/100; 709/220; 709/223; 709/225

(58) Field of Classification Search ............ 707/1–3, 707/9–10, 4, 104.1; 709/225–227, 203, 219, 709/223, 224, 220, 222; 703/21
See application file for complete search history.

(56) References Cited

U.S. PATENT DOCUMENTS

| 6,135,646 A | * | 10/2000 | Kahn et al. ............... 709/217 |
| 6,697,806 B1 | * | 2/2004 | Cook ............................ 707/10 |
| 2002/0140917 A1 | * | 10/2002 | McArthur et al. ............ 355/53 |
| 2004/0057405 A1 | * | 3/2004 | Black ........................... 370/335 |
| 2004/0064692 A1 | * | 4/2004 | Kahn et al. .................. 713/167 |

FOREIGN PATENT DOCUMENTS

| EP | 0 964 588 A2 | 12/1999 |
| EP | 1 045 598 A1 | 10/2000 |

OTHER PUBLICATIONS

Novell ZENWorks for Desktops, Deployment version 3. Sep. 2000. Novell Press.*
Novell's ZENworks Administrator's Handbook. Ron Tanner and Brad Dayley. Novell Press. 1999. 141-215.*
Akihiro Tominaga et al., "Problems and Solutions of DHCP—Experiences with DHCP Implementation and Operation", Apr. 28, 1995, internet document printed from http://www.isoc.org/HMP/PAPER/127/html/paper.html, 17 pages.
ZENworks for Desktops, Deployment Manual, Version 3, Sep. 2000, Novell, Inc., pp. 1-202.

* cited by examiner

*Primary Examiner*—Jason Cardone
*Assistant Examiner*—Jeffrey R. Swearingen
(74) *Attorney, Agent, or Firm*—Pillsbury Winthrop Shaw Pittman, LLP (57) ABSTRACT

A system and method for registering a workstation. The system enables a client to locate an import service for importing workstation information using the domain name system (DNS). A client may send registration information to the import service after locating the import service using the DNS. The import service may then create a workstation object based on at least a portion of the registration information. The import service may then forward the workstation object to the client for registering the workstation.

35 Claims, 6 Drawing Sheets

SYSTEM AND METHOD FOR REGISTERING A CLIENT DEVICE

FIELD OF THE INVENTION

The invention relates to a system and method for workstation registration. More particularly, the invention relates to a system and method that enables a client to locate an import service using the domain name system and to obtain a workstation object by requesting registration of a workstation.

BACKGROUND OF THE INVENTION

Workstation registration may be used to assist in managing a plurality of clients connected over a network to one or more servers. Workstation registration may provide information regarding a particular client and user of that client. To enable workstation registration, a workstation import service may be used to import information regarding the workstation. Importing workstation information typically only occurs once. The workstation import service may initially create a workstation object in a network tree that identifies devices connected over the network. The workstation import service may populate the workstation object with default values and update workstation properties with current registration information. The workstation import service may use a workstation import policy to determine where a workstation object is to be created and how the workstation object should be named.

The workstation import policy typically includes the following steps. First, a server policy package is created for a particular platform, for example, Microsoft Windows™, Unix™, Macintosh™. The server policy package is typically created at a client. A system administrator may then enable the workstation import policy which may be at a remote location. The client then associates the workstation import policy enabled by the system administrator with the server, server group or server container.

Unlike workstation importing, workstation registration typically occurs when a workstation manager program starts up, a user logs-in to the tree, or a user logs-out of the tree. Workstation registration typically includes the following steps. A client may register workstation information about a client. A system administrator may then import the workstation, using the workstation information, and notify the client. The client may then verify that the workstation has been created and record a name assigned to the workstation. Such systems typically require multiple steps and intervention by a plurality of users. This increases communications over the network.

Another problem relates to assigning rights for performing tasks. Task rights may be assigned to a server container. This, however, may permit a broad class of servers and other directory objects to perform one or more tasks. Thus, some of the directory objects may have undesired, but authorized rights have particular tasks performed. This is a drawback.

These and other drawbacks exist.

SUMMARY OF THE INVENTION

An object of the invention is to overcome these and other drawbacks of existing systems.

Another object of the invention is to provide a system and method for enabling a client to register a workstation.

Another object of the invention is to provide a system and method for enabling a client to register a workstation by obtaining a workstation object.

Another object of the invention is to provide a system and method for enabling a client to locate an import service using the domain name system to register a workstation.

Another object of the invention is to provide a system and method wherein the workstation object is a persistent object.

Another object of the invention is to provide a system and method that enables delegation of one or more tasks to a service.

Another object of the invention is to provide a system and method that permit implementations of one or more tasks by assigning one or more rights to the service.

Another object of the invention is to provide a system and method that permit implementations of one or more tasks by assigning rights to a policy governing the service.

The invention relates in one regard to a system and method for registering workstations. The system enables a client to register a workstation without requiring intervention by a system administrator. The client may register a workstation by using the domain name system to locate an import service for registering the workstation. The client may send registration information to the import service over a network. The import service may create a workstation object based on at least a portion of the registration information. The import service may then forward the workstation object to the client. The client may then store the workstation object for registering the workstation.

The invention also relates in one regard to a system and method for enabling delegation of one or more tasks to a service. The invention enables a user to assign one or more rights to a service using a policy object. The service may be governed by the policy. A user may assign tasks to be performed by the service by specifying one or more rights in the policy object. After a service has been requested to perform a task, the service may authenticate the policy. The service may determine whether rights to perform the task requested have been granted, and if so, may perform the task.

DETAILED DESCRIPTION OF PREFERRED EMBODIMENTS

Figure 1:
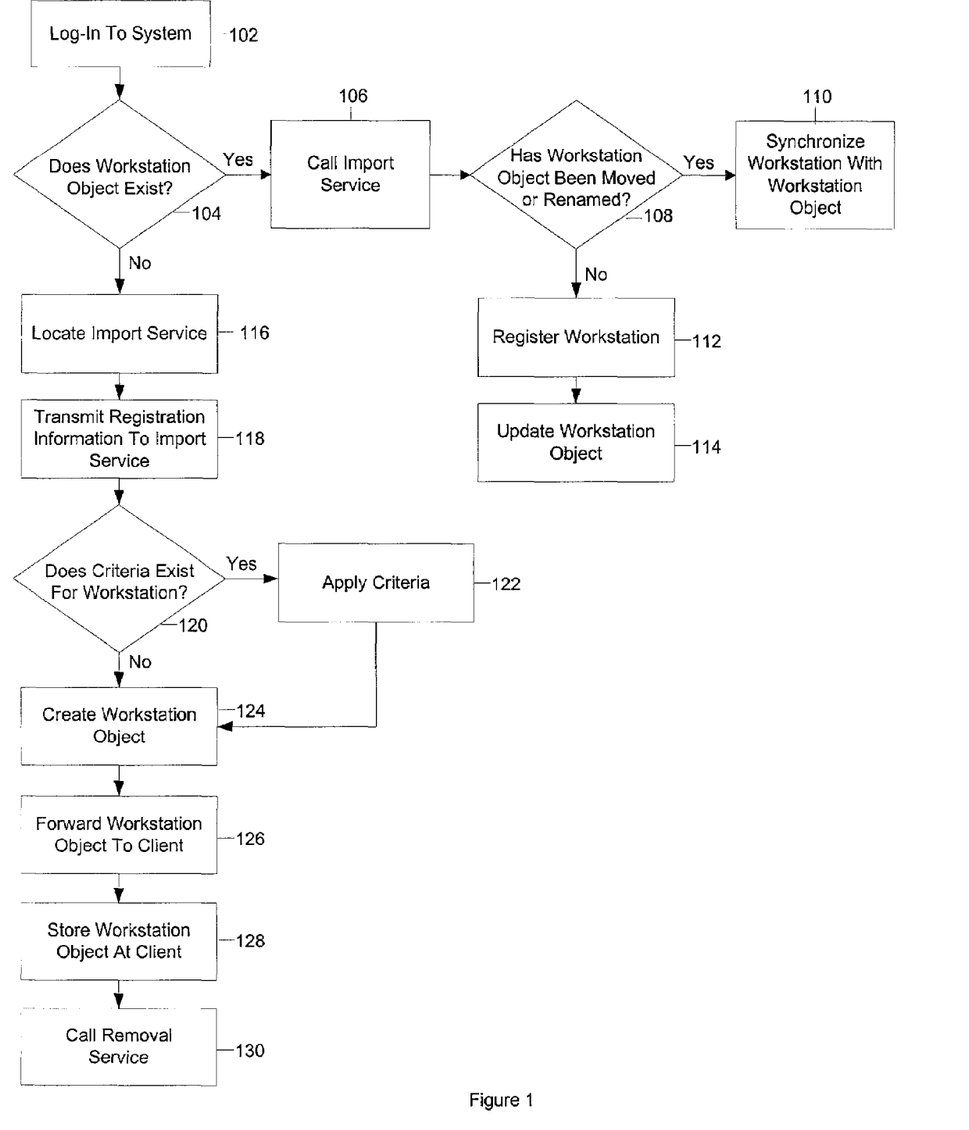
FIG. 1 is a schematic block diagram of a method for registering a workstation according to one embodiment of the invention.

The invention relates to a system and method for registering workstations. FIG. 1 illustrates a method for registering workstations according to one embodiment of the invention.

The method may begin at step 102 when a workstation manager program starts-up or a user logs-in to the system. The log-in may include a user inputting a user identification and password using a client and submitting the user identification and password to the system. The log-in may also include logging in a workstation to a network tree.

After the workstation manager program starts-up or a user logs-in, step 104 may determine whether a workstation object exists for the client. A workstation object may be an object stored at a client that provides information about the client and possibly users of that client. For example, the workstation object may store a client name, network address, server, user profile(s), user preference(s), security information (e.g., applications, documents or other information to which a particular user may or may not have access), etc.

If a determination is made that a workstation object exists for the client, step 106 may be used to call an import service. The import service may maintain records indicating a workstation name, address, server associated with the workstation, or other information. Step 108 may then be used, by the import service, to determine whether the workstation object has been moved or renamed. If a determination is made that the workstation object has been moved or renamed, the import service may retrieve information regarding the workstation object and synchronize the workstation with the workstation object in step 110. Synchronization may include updating a name or location of a workstation object at the client to coincide with information about the workstation retrieved by the import service.

If the import service determines in step 108 that the workstation object has not been moved or renamed, step 112 may be used to register the workstation. Registering the workstation may include gathering information regarding the workstation. This information may include a network address for the workstation, a time at which the workstation was registered, a network address for a server that was a last in communication with the workstation, user information for a user that last logged in to that workstation, or other information. Step 114 may then be used to update the workstation object with the information gathered. In this manner, an import service may not be contacted, thus reducing network traffic.

If, however, step 104 determines that a workstation object does not exist, step 116 may be used to locate an import service. Step 116 may use the domain name system (DNS) to locate the import service. The DNS may provide an Internet protocol address for the import service using any known method.

After determining the location for the import service, step 118 may be used to transmit workstation registration information to the import service. Step 120 may then be used to determine whether criteria exists for the workstation to be registered. Criteria may include rules established by, for example, a system administrator or other user, that specifies how a workstation is to be named, where the workstation is to be created, how user rights are to be managed, etc.

If step 120 determines that criteria exists, step 122 may be used to apply the criteria to the workstation registration. If a determination is made that criteria does not exist or after applying the criteria in step 122, step 124 may be used to create a workstation object. The workstation object may include information about the workstation such as a client name, where the client is located, user name, Internet protocol (IP) address, server, or other information. The workstation object may be a persistent object. For example, the workstation object may be used to store state information, but the state information may be related to a physical device.

After the workstation object is created, step 126 may be used to forward the workstation object to the client. The client may then store the workstation object using step 128.

Additionally, a removal service may be used to remove a workstation object. A removal service may be called using step 130. Step 130 may be set by, for example, a system administrator or other user, to remove a workstation object after, for example, a predetermined period of time. For example, a workstation object may be removed after a predetermined time period has elapsed. A system administrator or other user may establish removal criteria that removes a workstation object based on one or more occurrences. For example, if a workstation has not been registered for a predetermined time period, for example, ten (10) days, the removal service may be called using step 130 and the removal service may remove the workstation object after ten (10) days of non-registration has elapsed. The removal service may be governed by a removal policy.

Figure 2A:
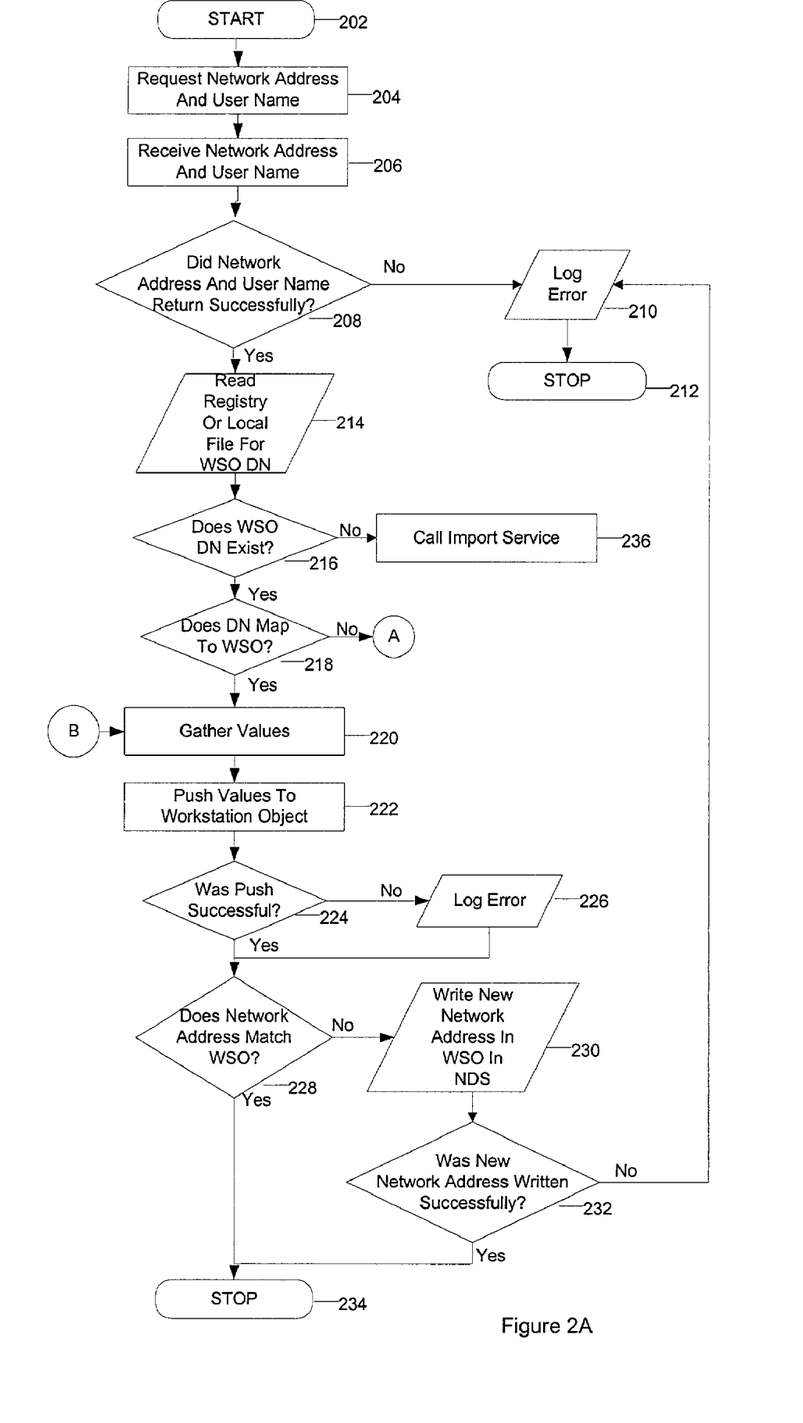
FIG. 2A is a schematic block diagram of a method for registering a workstation according to one embodiment of the invention.

FIG. 2A illustrates a method for registering a workstation according to one embodiment of the invention. The method may start at step 202. Step 204 may be used to request a network address and a user name from a server using a client. The client may receive the network address and user name from the server using step 206. Step 208 may determine whether the network address and user name were returned successfully. If a determination is made that the network address and user name did not return successfully, step 210 may be used to log an error indicating that the network address and user name did not return successfully and the method may stop at step 212.

If, however, step 208 determines that the network address and user name did return successfully, step 214 may be used to read a registry or local file (depending on a device being used to request the network address and user name) for a windows security officer (WSO) distinguished name (DN). Step 216 may then be used to determine whether a WSO DN exists for the workstation. If a WSO DN exists, step 218 may be used to determine whether the DN maps to the WSO. If a determination is made that the DN does map to the WSO, step 220 may gather the values relating to that workstation. The values gathered may be attributes of the workstation, for example, name, location, specifications, etc.

After gathering the values, step 222 may be used to push the values to a workstation object and push the workstation object to the client. Step 224 may then be used to determine if the push was successful. If the push was not successful, an error may be logged using step 226. After logging the error, or if step 224 determines that the push was successful, step 228 may determine whether the network address matches the WSO. If a determination is made that the network address does match the WSO, the method may stop at step 234.

If, however, step 228 determines that the network address does not match the WSO, step 230 may be used to write a new network address in the WSO in, for example, the Novell Directory Service (NDS), although any directory may be used. After writing the new network address, step 232 may be used to determine whether the new network address was written successfully. If the new network address was written successfully, the method may stop at step 234. If the new network address was not written successfully, the method may return to step 210 and log the error and stop at step 212.

Returning to step 216, if step 216 determines that a WSO DN does not exist, step 236 may be used to call an import service. The import service may be used to determine whether the workstation has been moved or renamed. If the import service determines that the workstation has been moved or renamed, the updated information may be synchronized with the client. If the import service does not locate a workstation identified, the import service may clear any values associated with that workstation and re-register the workstation.

Figure 2B:
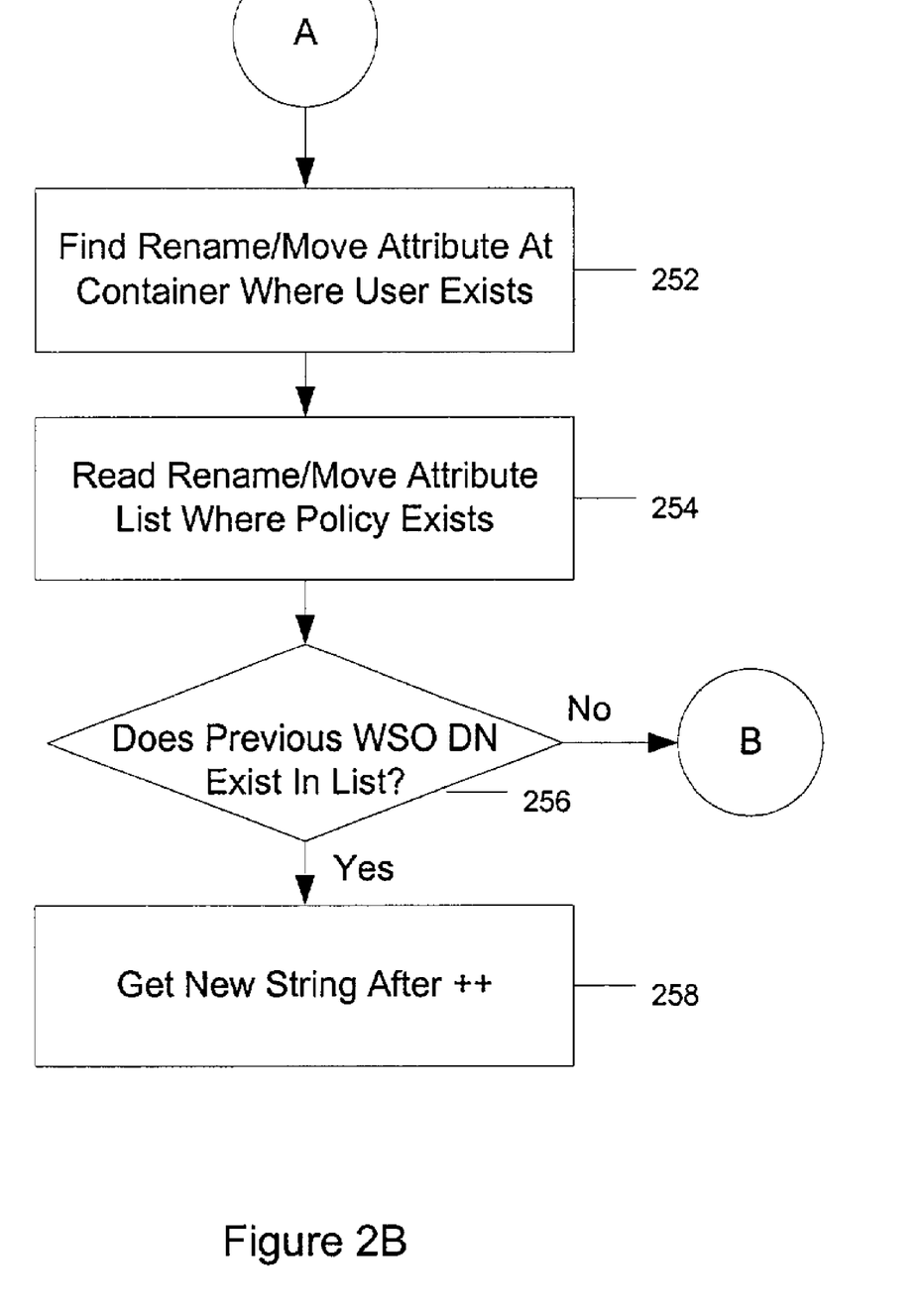
FIG. 2B is a schematic block diagram of a method for registering a workstation according to one embodiment of the invention.

Returning to step 218, if step 218 determines that the DN does not map to the WSO, step 252 may be used to find a rename or move attribute at a container where a user exists as illustrated in FIG. 2B. Step 254 may then be used to read the rename/move attribute list where a policy exists.

After reading the attribute list, step 256 may be used to determine whether a previous WSO DN exists in the list. If step 256 determines that a WSO DN exists in the list, the method may proceed to step 220. If, however, step 256 determines that a WSO DN does exist in the list, step 258 may be used to retrieve a new string provided after a "++" provided in a value string.

Figure 3:
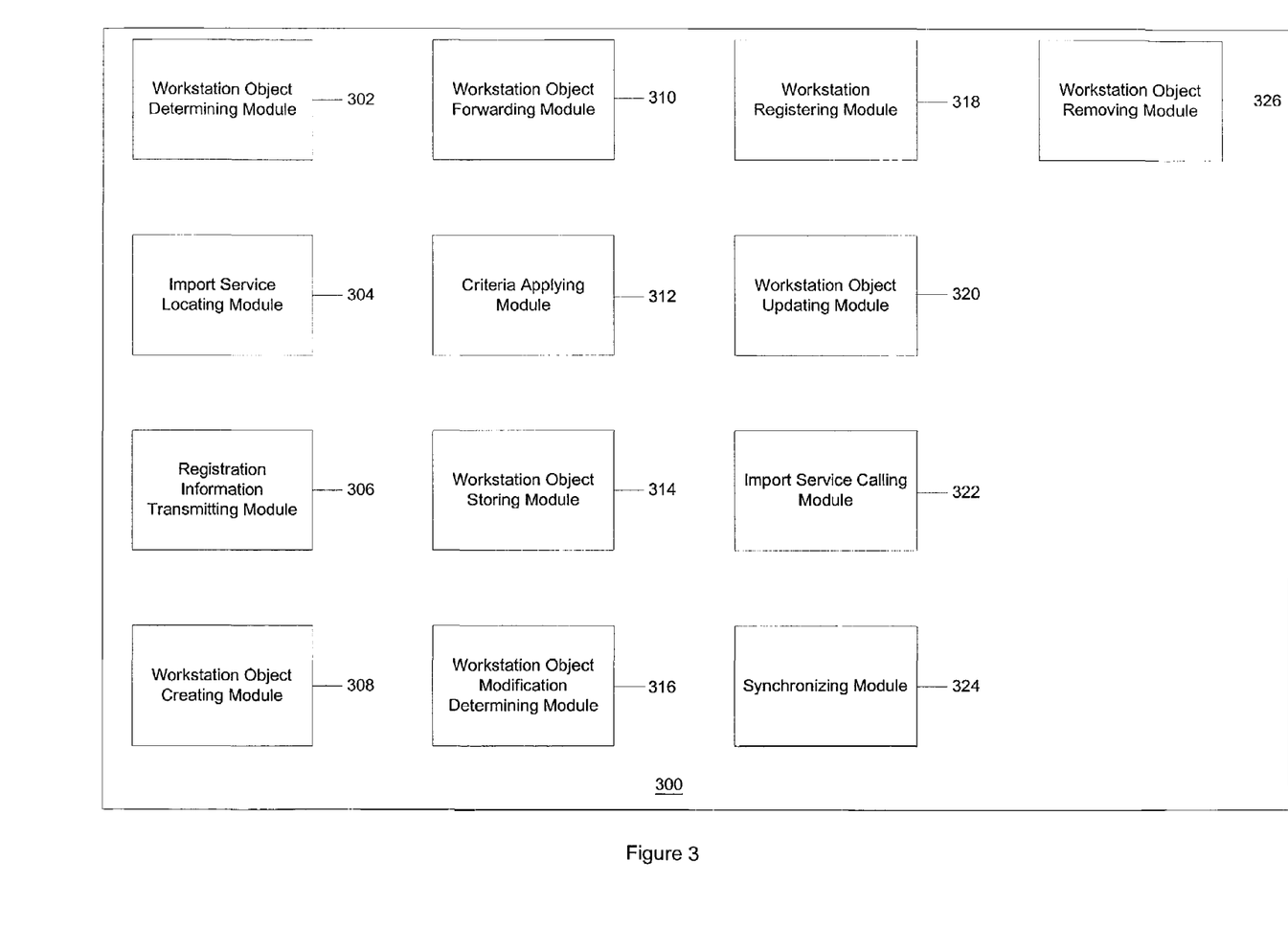
FIG. 3 is a schematic block diagram of a system for registering a workstation according to one embodiment of the invention.

FIG. 3 is an illustration of a system 300 for registering a workstation. System 300 may include a workstation object determining module 302, import service locating module 304, registration information transmitting module 306, workstation object creating module 308, workstation object forwarding module 310, criteria applying module 312, workstation object storing module 314, workstation object modification determining module 316, workstation registering module 318, workstation object updating module 320, import service calling module 322, synchronizing module 324, and workstation object removing module 326.

Workstation object determining module may be used to determine whether a workstation object exists for a particular client. If a workstation object does not exist for the client, import service locating module 304 may be used to locate an import service for obtaining a workstation object for the client. Import service locating module may use the DNS for locating the import service. After an import service has been located, registration information transmitting module 306 may transmit registration information about the client to the import service. A workstation object for the client may then be created based on at least a portion of the registration information using workstation object creating module 308. The workstation object may then be forwarded to the client using workstation object forwarding module 310.

When creating the workstation object, a criteria applying module 312 may be used to apply one or more criteria to the workstation object. For example, the criteria may include how to name a workstation, where a workstation is to be created, etc.

After receiving the workstation object, a workstation object storing module 314 may be used to store the workstation object.

If a workstation object already exists for a particular client, workstation object modification determining module 316 may be used to determine whether the workstation object has been modified. For example, workstation object modification determining module 316 may be used to determine whether the workstation object has been moved or renamed. If workstation object modification determining module 316 determines that the workstation object has not been modified, workstation registering module 318 may be used to register the workstation. Workstation object updating module 320 may then update the workstation object by including, for example, a network address for the workstation, a time at which the workstation was registered, a server that was last in communication with the workstation, information regarding a last user of the workstation, or other information.

If workstation object modification determining module 316 determines that the workstation object has been modified, import service calling module 322 may be used to call an import service to determine updated information regarding the workstation object. The import service may be called using any known method. Import service calling module 302 may also retrieve information about the workstation and compare that information with registration information received from the workstation. Synchronizing module 324 may then be used to synchronize the information retrieved by the import service calling module 322 with the registration information received from the client. The registration information may then be updated to reflect the modifications made to the workstation object.

Workstation object removing module 326 may be used to remove one or more workstation objects. For example, a system administrator or other user may establish one or more criteria for removing a workstation object. The system administrator or user may establish that a workstation object is to be removed if a particular workstation has not been registered after a predetermined period of time, for example, ten (10) days. Therefore, if a workstation is not registered for ten (10) days, workstation object removing module 326 may automatically remove a workstation object.

According to another embodiment of the invention, the invention also enables delegating one or more tasks to a service. The overall process of determining whether a particular task may be delegated may be called authentication. Authentication typically occurs before a service is called.

As described above, services may be used, for example, to create or remove objects. The services are typically governed by a policy. The invention facilitates delegation of, for example, server tasks, by enabling users to assign one or more rights to a service.

Figure 4:
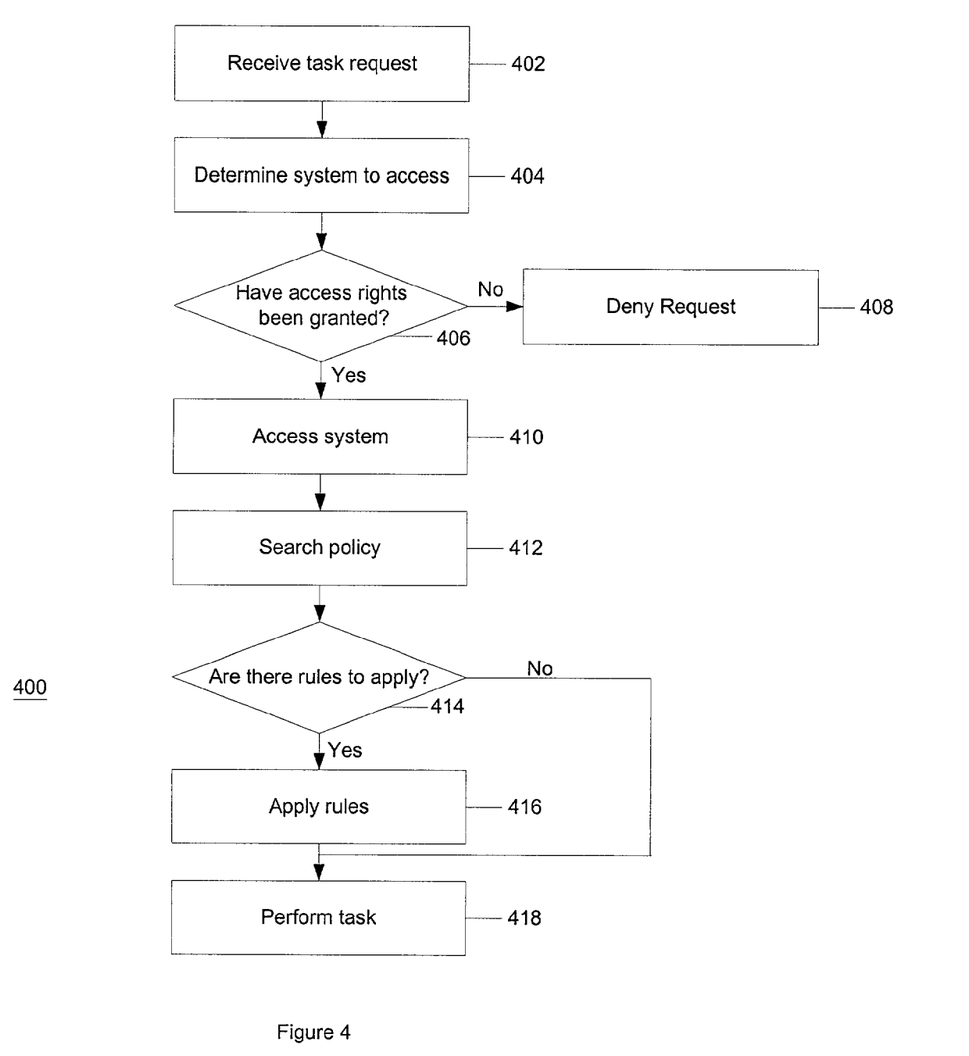
FIG. 4 is a schematic block diagram of a method for performing a delegated tasks according to one embodiment of the invention.

FIG. 4 illustrates a method 400 for performing a delegated task. A task request may be submitted to a service by a client and received in step 402. The service may determine a system, for example, a directory or database that may be accessed to satisfy the task request in step 404. Step 406 may then determine whether the service has rights to have the task performed. If step 406 determines that the service does not have at least a minimum threshold of rights, step 408 may deny the request and notify the client by, for example, presenting a "Request Denied" view.

If, however, step 406 determines that the service has sufficient rights, step 410 may access the system that may be used to satisfy the request as determined by step 404. Step 412 may then search a policy governing the service for criteria related to the task requested. Step 414 may determine whether the policy provides any rules for performing the task. For example, if a workstation object is created, an import policy may provide a rule that a system administrator is to be notified, for example, via electronic mail, that the workstation object was created and possibly any parameters associated with the workstation, for example, name, network address, etc.

If step 414 determines that one or more rules are to be applied, the rules may be applied in step 416. After applying the rules in step 416, or, if step 414 determines that there are no rules to apply step 418 may be used to perform the task requested.

Figure 5:
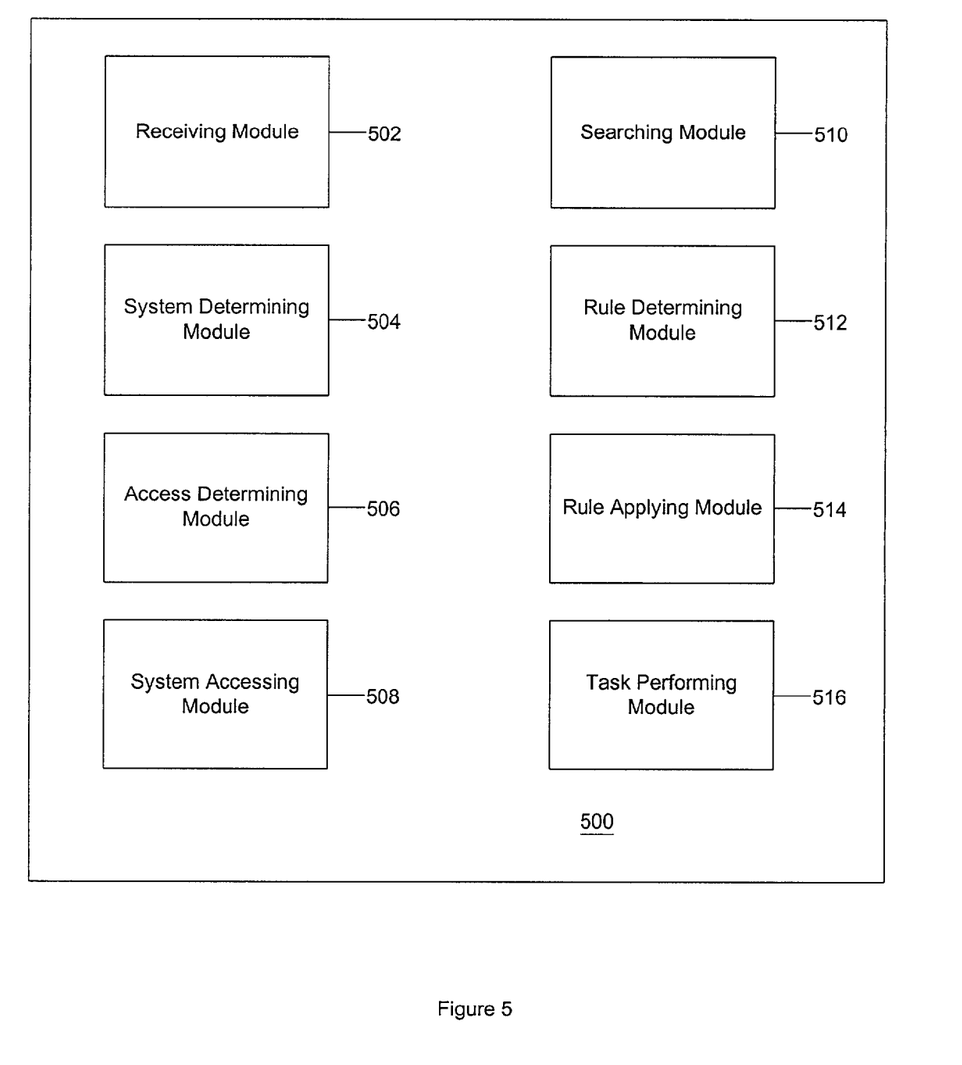
FIG. 5 is a schematic block diagram of a system for performing a delegated task according to one embodiment of the invention.

FIG. 5 illustrates a system 500 for delegating one or more tasks to a service. System 500 includes receiving module 502, system determining module 504, access determining module 506, system accessing module 508, searching module 510, rule determining module 512, rule applying module 514, and task performing module 516. Receiving module 502 may be used to receive one or more task requests from one or more clients. After receiving a task request, system determining module 504 may be used to determine a system that may be used to satisfy the task request. Access determining module 506 may then be used to determine whether the service has rights to access the system determined by system determining module 504.

If access determining module 506 determines that the service has rights to access the system, system accessing module 508 may be used to access the system. Searching module 510 may then search the system to identify any rules related to the task requested. Rule determining module 512 may be used to determine the rules to be applied to a particular task. If rule determining module 512 determines that one or more rules are to be applied to the task, rule applying module 514 may be used to apply the one or more rules. After applying the rules or determining that there are no rules to apply, task performing module may perform the task.

The foregoing description of a system and method for registering a workstation is illustrative, and changes in the above construction and sequences of operation may occur to persons skilled in the art. For example, although multiple modules are shown for carrying out the invention, additional or fewer modules may be used and multiple modules may be positioned in various locations. The scope of the invention is accordingly intended to be limited only by the following claims.

What is claimed is:

1. A method of registering one or more workstations associated with a computer network, comprising the steps of:
    enabling a client terminal to access the computer network;
    determining whether the client terminal comprises a workstation object;
    if a determination is made that the workstation object is not present on the client terminal, obtaining workstation registration information including at least one of a client terminal name, a client terminal location, and an Internet protocol address corresponding to the client terminal;
    locating an import service;
    transmitting the workstation registration information from the client terminal to the import service;
    accessing criteria to enable creation of the workstation object;
    creating the workstation object based on at least a portion of the workstation registration information; and
    receiving the workstation object at the client terminal.

2. The method of claim 1, wherein the step of locating the import service uses a Domain Name System.

3. The method of claim 2, wherein the Domain Name System provides the client terminal with an Internet protocol address for the import service.

4. The method of claim 1, wherein the workstation object comprises client terminal information.

5. The method of claim 1, wherein the workstation object comprises user profile information.

6. The method of claim 1, wherein the workstation object comprises an Internet protocol address for the client terminal.

7. The method of claim 1, wherein the workstation object comprises information regarding a server in communication with the client terminal.

8. The method of claim 1, further comprising the step of removing the workstation object from the client terminal.

9. The method of claim 8, wherein the step of removing may be performed automatically after a predetermined period of time.

10. A system for registering one or more workstations that are associated with a computer network, comprising:
    a client terminal that enables a user to access the computer network;
    a workstation object determining module that determines whether the client terminal comprises a workstation object;
    an import service locating module, in communication with the workstation object determining module, that locates an import service if a determination is made that the workstation object does not exist on the client terminal;
    a registration information transmitting module, in communication with the import service locating module, that obtains workstation registration information including at least one of a client terminal name, a client terminal location, and an Internet protocol address corresponding to the client terminal, and transmits the workstation registration information from the client terminal to the import service;
    a workstation object creating module that creates the workstation object based on at least a portion of the workstation registration information;
    a workstation object storing module that stores the workstation object.

11. The system of claim 10, wherein the import service locating module uses a Domain Name System to locate the import service.

12. The system of claim 10, wherein the Domain Name System provides the client terminal with an Internet protocol address for the import service.

13. The system of claim 10, further comprising a criteria applying module that applies at least one criteria when creating the workstation object.

14. The system of claim 10, wherein the workstation object storing module stores the workstation object at the client terminal.

15. The system of claim 12, wherein the workstation object comprises client terminal information.

16. The system of claim 12, wherein the workstation object comprises an Internet protocol address for the client terminal.

17. The system of claim 12, wherein the workstation object comprises information regarding a server in communication with the client terminal.

18. A method of registering one or more workstations associated with a client terminal, comprising the steps of:
    determining whether the client terminal comprises a workstation object;
    if a determination is made that the workstation object is present on the client terminal, obtaining workstation registration information corresponding to the client terminal;
    determining whether an identifier for the workstation object has been modified;
    registering the one or more workstations associated with the workstation object if a determination is made that the identifier for the workstation object has not been modified; and
    updating the workstation object to include the workstation registration information.

19. A method of registering one or more workstations associated with at least one client terminal, comprising the steps of:

establishing a communication with the at least one client terminal;

obtaining workstation registration information corresponding to the at least one client terminal;

creating, remotely from the client terminal, a workstation object based on at least a portion of the workstation registration information; and transmitting the workstation object to the at least one client terminal.

20. The method of claim 19, further comprising the step of applying at least one criteria to the workstation registration information.

21. The method of claim 19, wherein the workstation object comprises client terminal information.

22. The method of claim 19, wherein the workstation object comprises an Internet protocol address for the at least one client terminal.

23. The method of claim 19, wherein the workstation object comprises information regarding a server in communication with the at least one client terminal.

24. A method of registering one or more workstations associated with a client terminal, comprising the steps of:

determining whether the client terminal comprises a workstation object;

if a determination is made that the workstation object is present on the client terminal, obtaining workstation registration information corresponding to the client terminal;

calling an import service to determine whether an identifier associated with the workstation object has been modified;

if the identifier associated with the workstation object has modified enabling the import service to locate the workstation object; and synchronizing the workstation with the workstation object, including updating the identifier associated with the workstation object.

25. A method for enabling a service to perform at least one task, comprising the steps of:

receiving at least one task that is requested to be performed by the service;

enabling the service to determine a system that is capable of performing the at least one task;

determining whether the service has rights to perform the at least one task;

if a determination is made that the service has rights to perform the at least one task, granting permission to the system to perform the at least one task;

searching a policy governing the service for criteria relating to the at least one task; and determining whether the policy identifies at least one rule to be applied to perform the at least one task.

26. The method of claim 25, further comprising the step of applying the at least one rule to perform the at least one task, if the at least one rule is identified.

27. The method of claim 25, further comprising the step of performing at least one task whether or not at least one rule is identified.

28. The method of claim 25, wherein the system is a directory.

29. The method of claim 25, wherein the step of searching a policy comprises searching a policy object.

30. A device for enabling a service to perform at least one task, comprising:

a receiving module that receives at least one task that is requested to be performed by the service;

a system determining module that determines a system that is capable of performing the at least one task;

an access determining module that determines whether the service has rights to perform the at least one task using the system;

a system accessing module that accesses the system if a determination is made that the service has access rights to perform the at least one task using the system;

a searching module that searches a policy governing the service to identify rules related to the at least one task; and a rule determining module that identifies one or more rules to be applied to the at least one task.

31. The device of claim 30, further comprising a rule applying module that applies the one or more rules to be applied to the at least one task.

32. The device of claim 31, further comprising a task performing module that performs the one or more tasks.

33. The device of claim 30, further comprising a task performing module that performs the one or more tasks.

34. The device of claim 31, Wherein the system is a directory.

35. The device of claim 31, wherein the searching module searches a policy object.

* * * * *